(12) United States Patent
Tanji (10) Patent No.: US 9,148,747 B2
(45) Date of Patent: Sep. 29, 2015

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Masamichi Tanji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/184,629

(22) Filed: Feb. 19, 2014

(65) Prior Publication Data

US 2014/0240769 A1 Aug. 28, 2014

(30) Foreign Application Priority Data

Feb. 22, 2013 (JP) ................................. 2013-033420

(51) Int. Cl.

| | |
|---|---|
| *G06F 3/12* | (2006.01) |
| *H04N 1/00* | (2006.01) |
| *H04N 1/04* | (2006.01) |
| *G06K 15/02* | (2006.01) |
| *H04W 4/00* | (2009.01) |
| *G06K 15/00* | (2006.01) |
| *H04L 29/08* | (2006.01) |
| *H04N 1/327* | (2006.01) |
| *H04W 4/20* | (2009.01) |
| *H04W 76/02* | (2009.01) |

(52) U.S. Cl.
CPC ............ *H04W 4/005* (2013.01); *G06F 3/1204* (2013.01); *G06F 3/1236* (2013.01); *G06F 3/1292* (2013.01); *G06K 15/002* (2013.01); *H04L 67/04* (2013.01); *H04N 1/00307* (2013.01); *H04N 1/32767* (2013.01); *H04W 4/20* (2013.01); *H04W 76/02* (2013.01); *H04N 1/00233* (2013.01); *H04N 2201/0094* (2013.01); *H04N 2201/0098* (2013.01)

(58) Field of Classification Search
None
See application file for complete search history.

(56) References Cited

U.S. PATENT DOCUMENTS

| | | | | |
|---|---|---|---|---|
| 8,572,222 | B2* | 10/2013 | Sakai et al. ................... | 709/223 |
| 2008/0043110 | A1* | 2/2008 | Aizawa ....................... | 348/211.2 |
| 2009/0298477 | A1* | 12/2009 | Iio ............................... | 455/414.1 |
| 2011/0072501 | A1* | 3/2011 | Fukui ............................... | 726/8 |
| 2011/0149816 | A1* | 6/2011 | Saito et al. ..................... | 370/310 |
| 2011/0294548 | A1* | 12/2011 | Jheng et al. ................... | 455/558 |
| 2012/0303978 | A1* | 11/2012 | Chen .............................. | 713/300 |
| 2013/0100486 | A1* | 4/2013 | Mccoog et al. .............. | 358/1.15 |

FOREIGN PATENT DOCUMENTS

JP 2002-111860 A 4/2002

* cited by examiner

*Primary Examiner* — Beniyam Menberu
(74) *Attorney, Agent, or Firm* — Canon USA, Inc. IP Division (57) ABSTRACT

A communication apparatus capable of executing a wireless communication includes an identification unit, a display unit, a notification unit, and a connection unit. The identification unit identifies a communication partner of the wireless communication. The display unit displays, if an external apparatus which is the communication partner of the wireless communication is identified by the identification unit, a confirmation screen for allowing a user to confirm whether to execute the wireless communication with the external apparatus. The notification unit notifies, if the confirmation screen is displayed by the display unit, the external apparatus that the user is confirming whether to execute the wireless communication. The connection unit executes, if the user issues an instruction via the confirmation screen to execute the wireless communication with the external apparatus, connection processing for executing the wireless communication with the external apparatus.

10 Claims, 11 Drawing Sheets

700 CONFIRMATION SCREEN

FIG. 10

COMMUNICATION APPARATUS, METHOD FOR CONTROLLING COMMUNICATION APPARATUS, AND STORAGE MEDIUM

BACKGROUND OF THE INVENTION

1. Field of the Invention

The present invention relates to a communication apparatus, a method for controlling the communication apparatus, and a storage medium.

2. Description of the Related Art

Among printing apparatuses such as printers or multifunction peripherals, the ones having a wireless local area network (LAN) function have been increasing in number. The printing apparatus having the wireless LAN function connects to an access point as a client, and then performs communication with an apparatus such as a personal computer (PC) or a mobile terminal via the access point. Japanese Patent Application Laid-Open No. 2002-111860 discusses a technique for simply identifying a desired access point from among a plurality of surrounding access points, then attempting to perform the wireless connection.

Further, the standard called Wi-Fi Direct (registered trademark) is established by the Wi-Fi Alliance.

In the Wi-Fi Direct, a protocol is defined for determining whether a communication apparatus such as a printing apparatus or a PC operates as an access point or a client. By executing the protocol, a communication apparatus that becomes an access point, and a communication apparatus that becomes a client can be automatically determined. By using the Wi-Fi Direct, the need to separately prepare an access point is eliminated, and communication apparatuses can execute direct wireless communications with each other.

Figure 1:
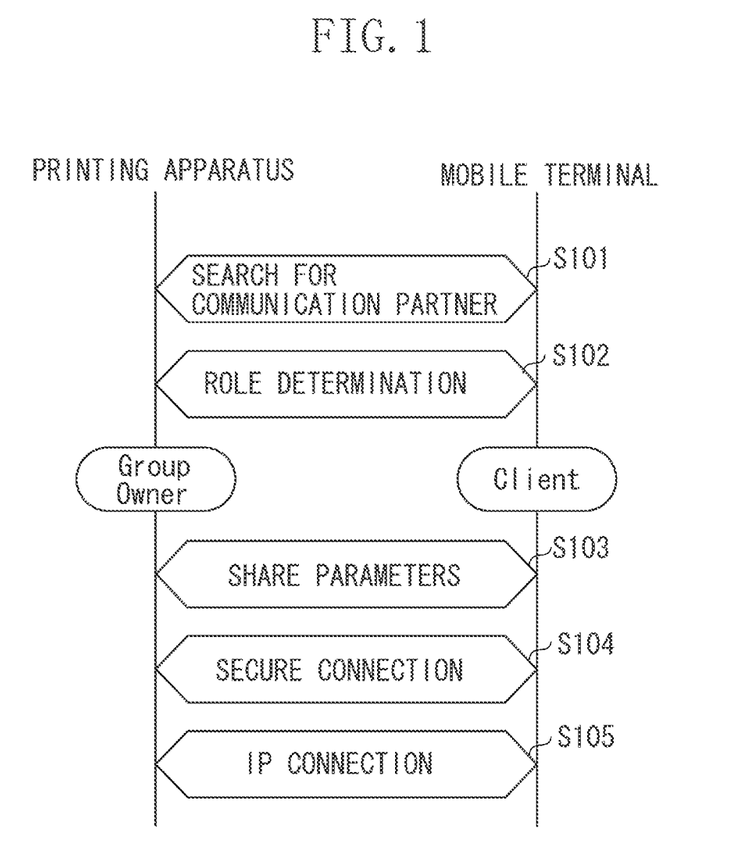
FIG. 1 is a diagram illustrating a processing sequence of Wi-Fi Direct.

FIG. 1 is a diagram schematically illustrating a processing sequence of the Wi-Fi Direct. Both a printing apparatus and a mobile terminal are assumed to support the Wi-Fi Direct.

First of all, in step S101, the printing apparatus and the mobile terminal mutually search for a communication partner, and then identify the communication partner. When the communication partner is identified, in step S102, it is determined which becomes an access point (group owner), and which becomes a client. The processing in step S102 is called a role determination. In FIG. 1, it is assumed that the printing apparatus has become a group owner, and the mobile terminal has become a client, as a result of the role determination in step S102.

Next, in step S103, by providing parameters for performing connection from the printing apparatus serving as a group owner to the mobile terminal serving as a client, using the Wi-Fi Protected Setup (WPS) defined by the Wi-Fi Alliance, the printing apparatus and the mobile terminal share the parameters therebetween. Then in step S104, the secure connection is performed using the parameters.

When the secure connection is completed, in step S105, addressing is performed for executing an Internet Protocol (IP) communication between the printing apparatus and the mobile terminal. At that time, the printing apparatus which is the group owner operates as a dynamic host configuration protocol (DHCP) server, and assigns an IP address to the mobile terminal which is the client.

A basic processing sequence of the Wi-Fi Direct is described above. By executing the present processing sequence, the printing apparatus and the mobile terminal become able to execute the direct wireless communication, without separately preparing an access point.

By using the above-described Wi-Fi Direct, a plurality of communication apparatuses can perform direct communications easily by identifying their communication partners. However, for example, when the printing apparatus and a first mobile terminal mutually search for a communication partner, if a second mobile terminal different from the first mobile terminal also searches for a communication partner, the printing apparatus may identify the second mobile terminal instead of the first mobile terminal as a communication partner. In this case, for a user of the first mobile terminal, the printing apparatus has come to be connected with the second mobile terminal, which is unintended by the user. While remaining unaware of it, when the user of the first mobile terminal tries to transmit data from the printing apparatus to the mobile terminal, there is an issue that the data is transmitted to the second mobile terminal instead of the first mobile terminal.

SUMMARY OF THE INVENTION

Thus, the present invention is directed to a communication apparatus capable of allowing a user to confirm whether to execute, if a communication partner of a wireless communication is identified, the communication with the identified communication partner, and a method for controlling the communication apparatus.

According to an aspect of the present invention, a communication apparatus capable of executing a wireless communication includes an identification unit configured to identify a communication partner of the wireless communication, a display unit configured to display, if an external apparatus which is the communication partner of the wireless communication is identified by the identification unit, a confirmation screen for allowing a user to confirm whether to execute the wireless communication with the external apparatus, a notification unit configured to notify, if the confirmation screen is displayed by the display unit, the external apparatus that the user is confirming whether to execute the wireless communication, and a connection unit configured to execute, if the user issues an instruction via the confirmation screen to execute the wireless communication with the external apparatus, connection processing for executing the wireless communication with the external apparatus.

According to another aspect of the present invention, a communication apparatus capable of executing a wireless communication includes an identification unit configured to identify a communication partner of the wireless communication, a display unit configured to display, if an external apparatus which is the communication partner of the wireless communication is identified by the identification unit, a confirmation screen for allowing a user to confirm whether to execute the wireless communication with the external apparatus, a connection unit configured to execute, if the user issues an instruction via the confirmation screen to execute the wireless communication with the external apparatus, connection processing for executing the wireless communication with the external apparatus, and a setting unit configured to set, based on a designation of the user, whether to execute confirmation via the confirmation screen, wherein, the connection unit executes, if it is set by the setting unit to execute confirmation via the confirmation screen, the connection processing after the display unit displays the confirmation screen, and wherein, the connection unit executes, if it is set by the setting unit not to execute confirmation via the confirmation screen, the connection processing without the display unit displaying the confirmation screen.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings. The following exemplary embodiments are not intended to limit the invention according to the claims, and not all of combinations of features described herein are essential for solving the aforementioned issue.

Figure 2:
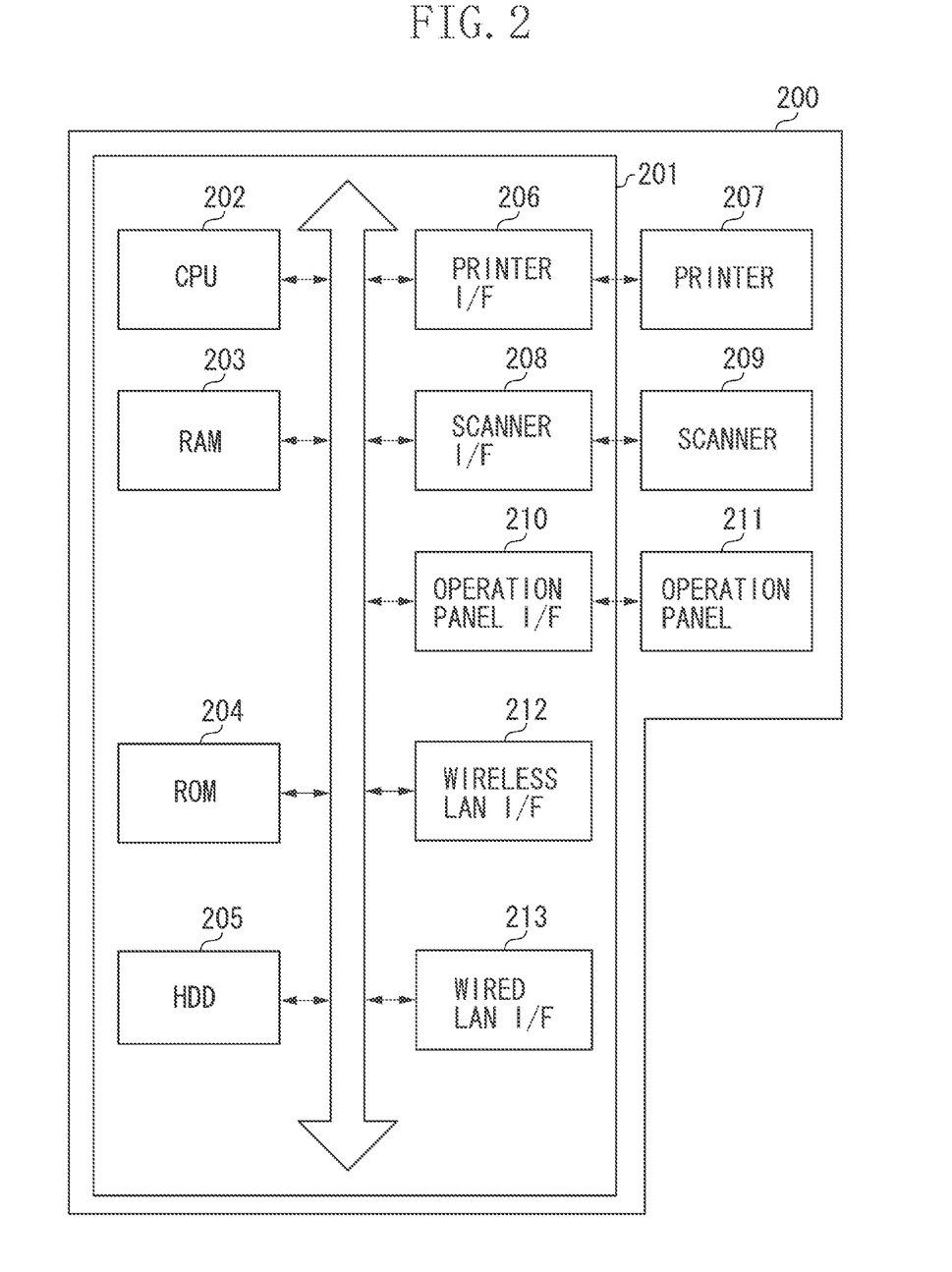
FIG. 2 is a diagram illustrating a hardware configuration of a printing apparatus.

FIG. 2 is a diagram illustrating a hardware configuration of a printing apparatus 200. The printing apparatus 200 is one example of a communication apparatus capable of executing wireless communications with an external apparatus (for example, a mobile terminal or a PC). The present invention can be applied not only to printing apparatuses but also to other apparatuses as long as they are capable of executing the wireless communications.

A control unit 201 including a central processing unit (CPU) 202 controls the operation of the entire printing apparatus 200. The CPU 202 reads a control program stored in a read-only memory (ROM) 204 and performs various types of controls such as a communication control.

A random-access memory (RAM) 203 is used as a main memory or a temporary area such as a work area of the CPU 202. A hard disk drive (HDD) 205 stores data or various types of programs, or various types of information tables.

A printer interface (I/F) 206 connects a printer 207 (printer engine) and the control unit 201. The printer 207 executes printing processing onto a sheet fed from a sheet feeding cassette (not illustrated), based on print data input via the printer I/F 206.

A scanner I/F 208 connects a scanner 209 and the control unit 201. The scanner 209 reads a placed document to generate image data. The image data generated by the scanner 209 is printed by the printer 207, is stored in the HDD 205, or is transmitted to an external apparatus via a wireless LAN I/F 212 or a wired LAN I/F 213.

An operation panel I/F 210 connects an operation panel 211 and the control unit 201. A configuration of the operation panel 211 will be described in detail with reference to FIG. 4 described below.

The wireless LAN I/F 212 executes wireless communications with an external apparatus such as a mobile terminal or a PC. Through the wireless communications, the printing apparatus 200 receives print data from the external apparatus, and the printer 207 executes printing processing based on the received print data. Further, the image data generated by the scanner 209 can be transmitted to the external apparatus, via the wireless LAN I/F 212.

The wired LAN I/F 213 is connected with a LAN cable (not illustrated) so as to execute communications with an external apparatus (not illustrated).

Figure 6:
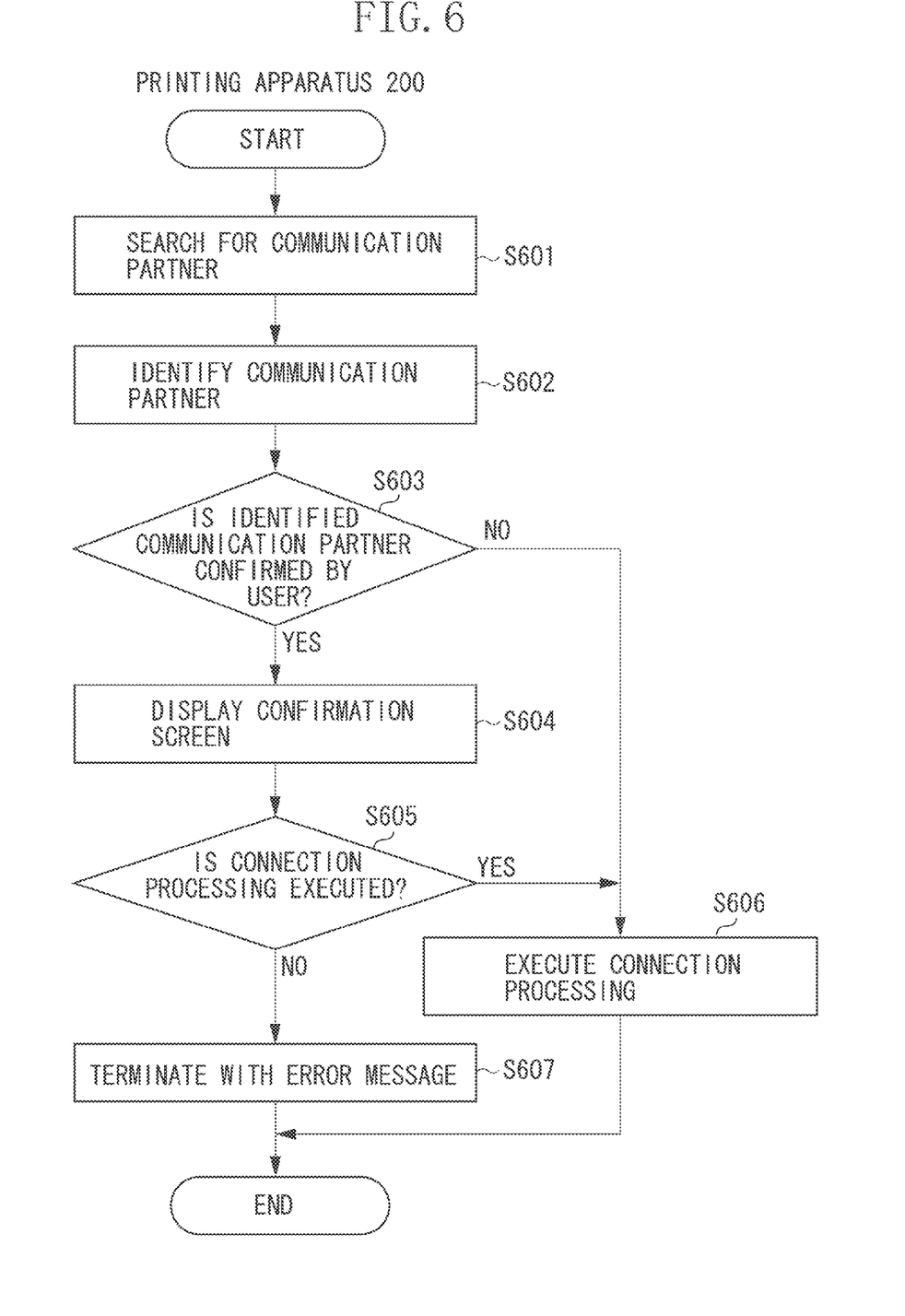
FIG. 6 is a flowchart illustrating processing executed by the printing apparatus according to a first exemplary embodiment.
Figure 9:
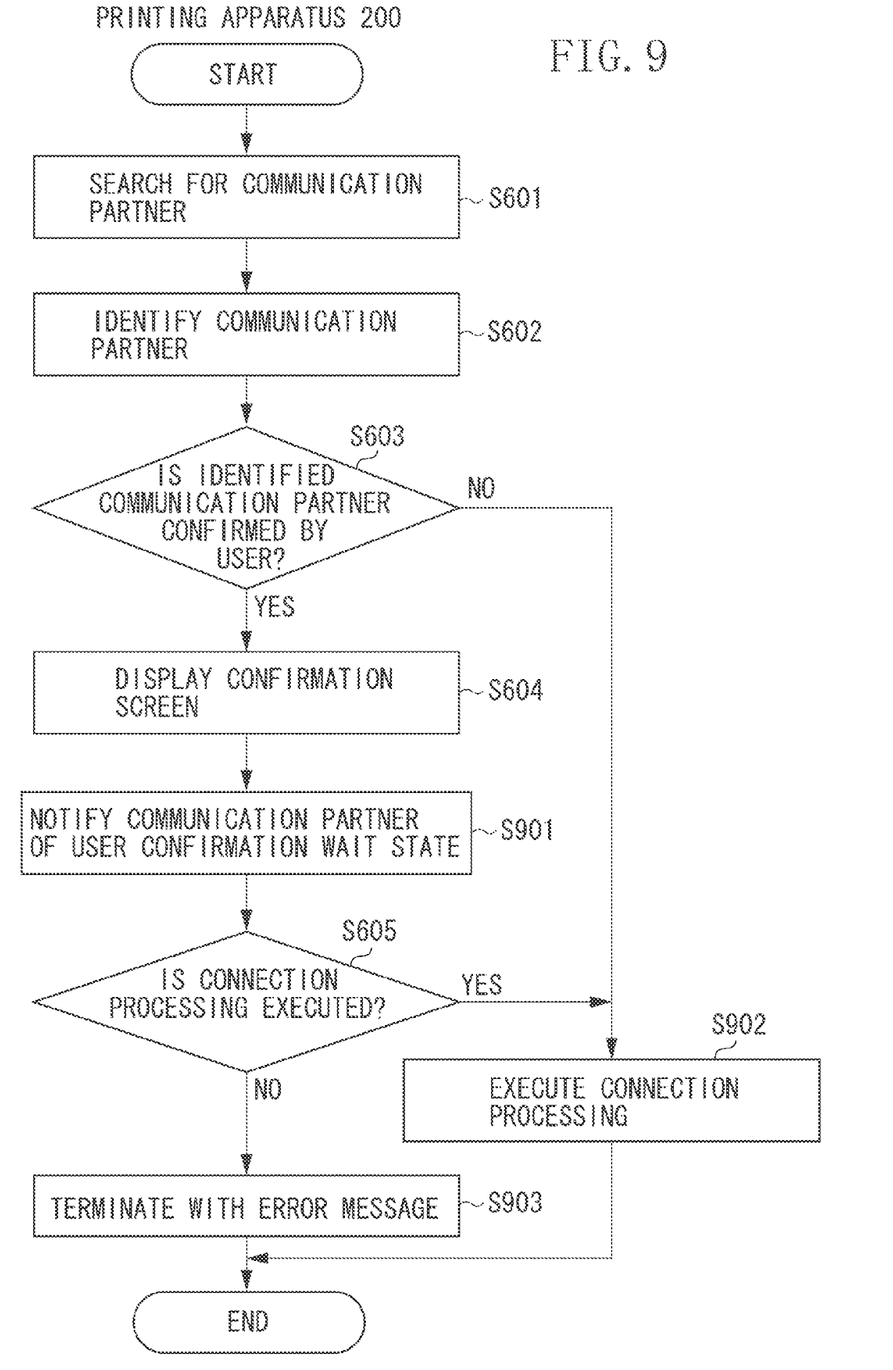
FIG. 9 is a flowchart illustrating processing executed by the printing apparatus according to a second exemplary embodiment.

The printing apparatus 200 is configured such that one CPU 202 executes respective processing illustrated in the flowchart of FIG. 6 or FIG. 9 described below using one memory (the RAM 203). However, other configurations may be employed. For example, the printing apparatus 200 can also execute processing illustrated in the flowchart of FIG. 6 or FIG. 9 described below, by causing a plurality of CPUs and a plurality of memories to operate cooperatively.

Figure 3:
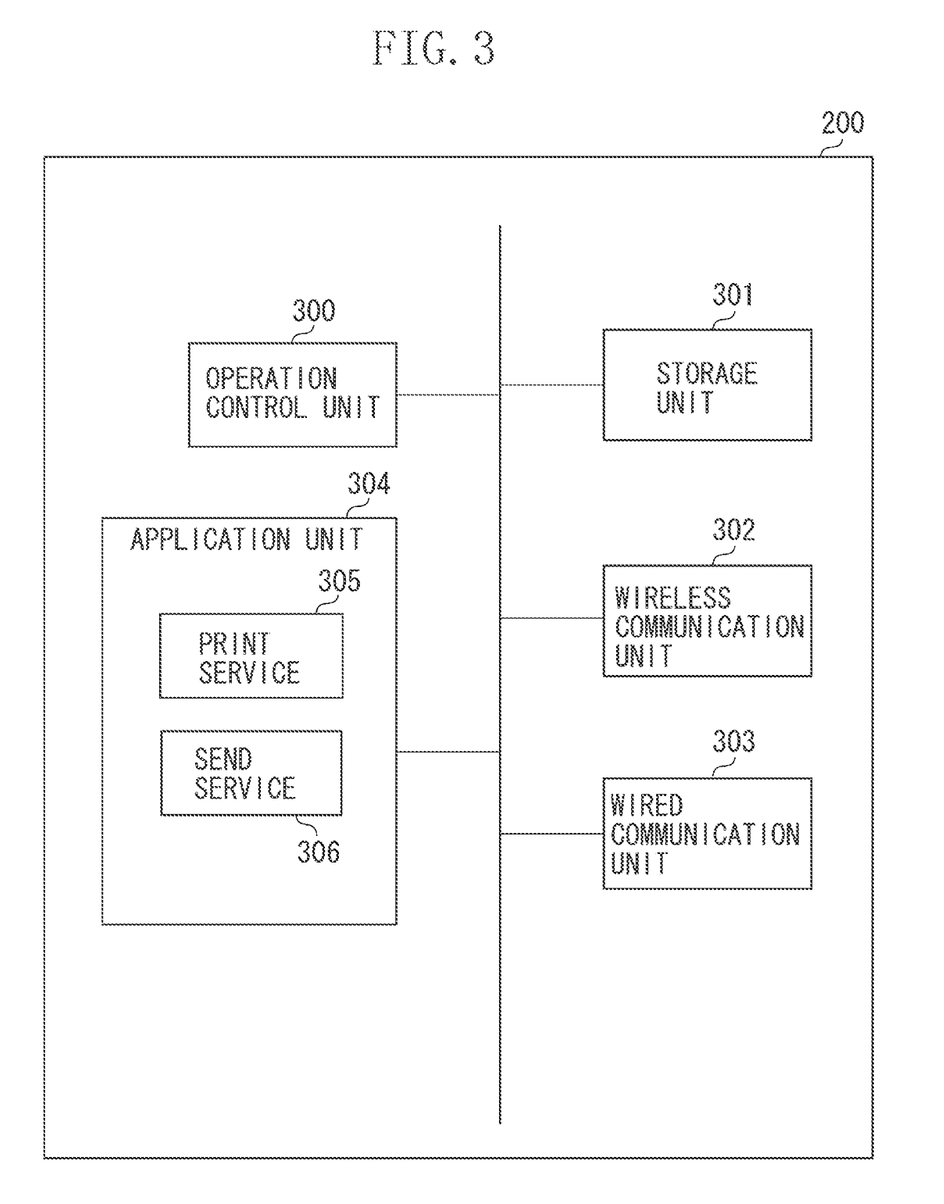
FIG. 3 is a diagram illustrating a software configuration of the printing apparatus.

FIG. 3 is a diagram illustrating a software configuration of the printing apparatus 200. Respective functional units illustrated in FIG. 3 are realized by the CPU 202 executing a control program stored in the ROM 204 or the HDD 205.

An operation control unit 300 controls the operation panel 211. For example, the operation control unit 300 displays an operation screen on the operation panel 211, and receives an instruction input by the user via the displayed operation screen. Further, the operation control unit 300 notifies other functional units of the received user's instruction, or updates the operation screen displayed according to the received user's instruction.

A storage unit 301 stores, according to instructions from other functional units, the designated data in the RAM 203 or in the HDD 205, or reads the stored data.

A wireless communication unit 302 controls wireless communication executed by the wireless LAN I/F 212. Further, a wired communication unit 303 controls communication executed by the wired LAN I/F 213.

An application unit 304 includes various types of services such as a print service 305 and an SEND service 306. The print service 305 inputs the print data received by the wireless LAN I/F 212 or the wired LAN I/F 213 into the printer 207. Then printing processing based on the print data is executed by the printer 207. Further, the SEND service 306 transmits the image data generated by the scanner 209 or the image data stored in the HDD 205 to the external apparatus via the wireless LAN I/F 212 or the wired LAN I/F 213. In the first exemplary embodiment, the print service 305 and the SEND service 306 have been described as the services provided by the application unit 304. However, other services may be provided.

Figure 4:
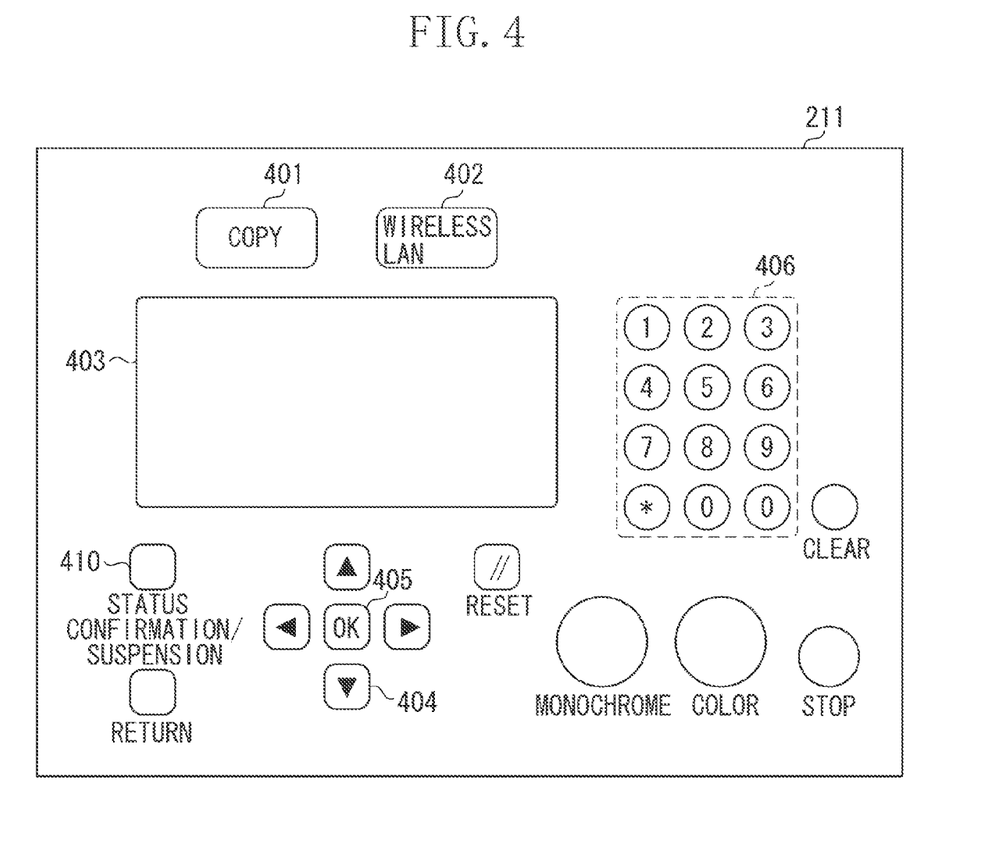
FIG. 4 is a diagram illustrating a configuration of an operation panel.

FIG. 4 is a diagram illustrating a detailed configuration of the operation panel 211.

When the user uses a copy function of the printing apparatus 200, a key 401 is pressed. When the user uses the wireless communications by use of the wireless LAN I/F 212, a key 402 is pressed. When the key 401 or the key 402 is pressed by the user, a screen corresponding to the pressed key is displayed on a display unit 403. On the display unit 403, various types of screens such as a screen corresponding to the pressed key, a screen for performing various settings of the printing apparatus 200, or a screen for checking a remaining amount of toner are displayed.

Arrow keys 404 are used for moving a cursor displayed on the display unit 403. The arrow keys 404 include four buttons including up, down, right, and left buttons. An OK key 405 is arranged in the center of the four arrow keys, and is used to determine the setting or the selection which the user has performed. For example, if the user wants to change a sheet size as a copy setting, the copy screen is displayed by pressing the key 401, and an item (sheet size) which the user wants to change is selected using the arrow keys 404, then the OK key 405 is pressed. With this operation, the copy screen is shifted to a change screen for changing the sheet size. Further, the user uses a ten-key pad 406 for inputting a number of copies or the like.

Figure 5A:
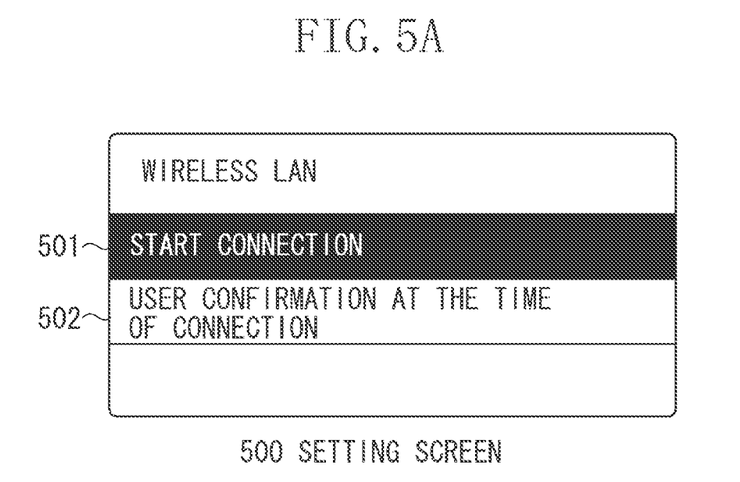
FIGS. 5A and 5B are diagrams illustrating setting screens.

When the user presses the key 402, a setting screen 500 illustrated in FIG. 5A is displayed on the display unit 403. When the user selects an item 501 by using the arrow keys 404 and the OK key 405, the wireless communication unit 302 starts the connection processing for performing the wireless communication with an external apparatus. The processing executed when the user selects the item 501 will be described in detail with reference to a flowchart in FIG. 6 described below.

In the present exemplary embodiment, the wireless LAN I/F 212 is capable of executing the Wi-Fi Direct. In the present exemplary embodiment, when a communication partner is searched for and identified, the user confirms whether the identified communication partner is a communication partner intended by the user (hereinafter, the function for the user confirmation is called a user confirmation function). Consequently, even if an apparatus unintended by the user is identified as the communication partner, the user can recognize the mistake.

Figure 5B:
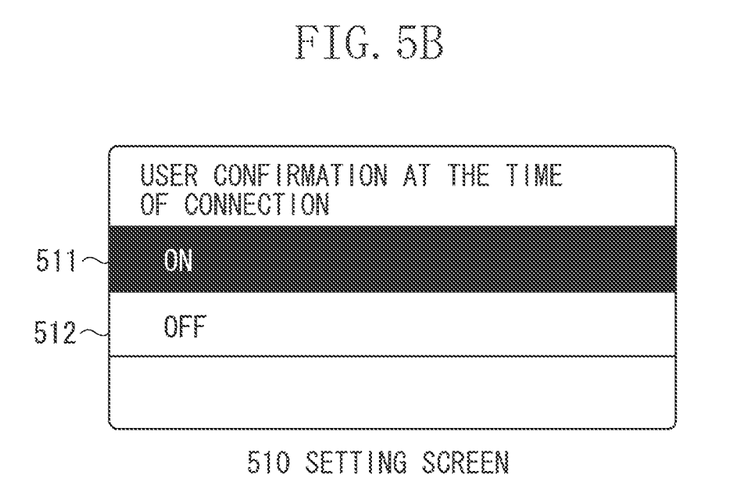

In the present exemplary embodiment, it is characterized that the user previously sets to the printing apparatus 200 whether the user confirmation function is made valid. When the user selects an item 502 on the setting screen 500, a setting screen 510 illustrated in FIG. is displayed on the display unit 403. When the user selects an item 511 on the setting screen 510, the storage unit 301 stores the information indicating that the user confirmation function is valid in a memory such as the HDD 205. On the other hand, when the user selects an item 512, the storage unit 301 stores the information that the user confirmation function is invalid in a memory (e.g., HDD 205). The setting performed on the setting screen 510 is used for the determination made in step S603 in the below-described flowchart of FIG. 6.

In the present exemplary embodiment, it is assumed that the settings on the setting screen 510 can be performed by any user. However, it may be assumed that only a specific user (for example, a user having administrator authority) can make the settings on the setting screen 510 by introducing a user authentication function into the printing apparatus 200. In the present exemplary embodiment, it has been described that the setting screen 500 is displayed on the display unit 403 by the user pressing the key 402. However, it may be displayed by other methods. For example, if the display unit 403 has a touch panel function, the setting screen 500 may be displayed on the display unit 403 by the user touching a predetermined icon displayed on the display unit 403.

Next, the processing executed when the item 501 on the setting screen 500 is selected by the user will be described with reference to the flowchart in FIG. 6. The respective steps illustrated in the flowchart of FIG. 6 are processed by the CPU 202 loading a program stored in a memory such as the ROM 204 into the RAM 203 and executing the program.

When the user selects the item 501 on the setting screen 500, the wireless communication unit 302 starts the connection processing for performing the wireless communication with an external apparatus. First, in step S601, the wireless communication unit 302 searches for a communication partner. In the present exemplary embodiment, the wireless communication unit 302 transmits a search packet for searching for an external apparatus that is currently executing connection processing. In the present exemplary embodiment, because the user instructs the external apparatus to perform the connection processing of the wireless communication at the same timing as that in step S601, the external apparatus that is currently executing the connection processing is searched for by the processing in step S601.

Next in step S602, the wireless communication unit 302 identifies a communication partner of the wireless communication. In the present exemplary embodiment, the wireless communication unit 302 identifies as a communication partner, an external apparatus that has responded first to the search packet transmitted in step S601.

Next in step S603, the wireless communication unit 302 determines whether the communication partner identified in step S602 is to be confirmed by the user. In the present exemplary embodiment, if the information indicating that the item 511 has been selected by the user on the setting screen 510 is stored in the HDD 205, the wireless communication unit 302 determines that the identified communication partner is to be confirmed by the user (YES in step S603), and the processing proceeds to step S604. On the other hand, if information indicating that the item 512 has been selected by the user on the setting screen 510 is stored in the HDD 205, the wireless communication unit 302 determines that the identified communication partner is not to be confirmed by the user (NO in step S603), and the processing proceeds to step S606.

Figure 7:
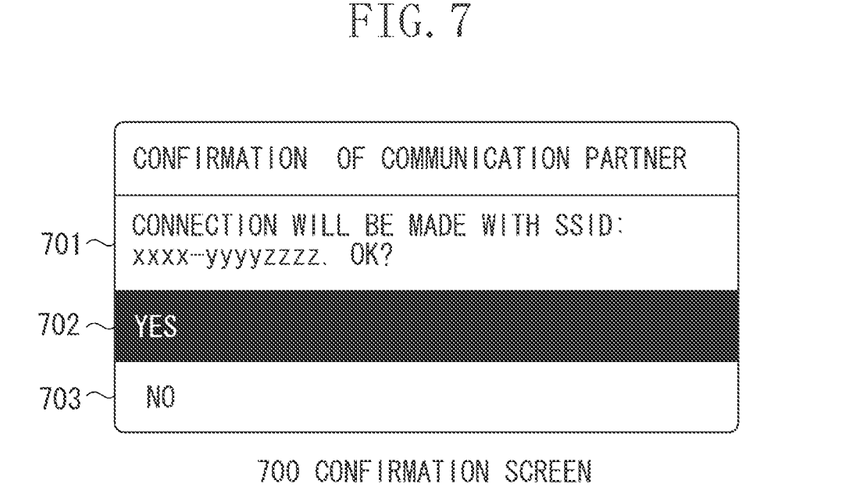
FIG. 7 is a diagram illustrating a confirmation screen.

Next in step S604, the operation control unit 300 displays a confirmation screen 700 illustrated in FIG. 7 on the display unit 403. The confirmation screen 700 is a screen for the user confirming whether the external apparatus identified in step S602 is a communication partner intended by the user. In the present exemplary embodiment, the user instructs the external apparatus to perform the connection processing of the wireless communication. If another user issues a similar instruction to a different external apparatus at the same timing, there is a possibility that the different external apparatus is identified as the communication partner in step S602. The confirmation screen 700 is displayed in step S604 so that, if an external apparatus unintended by the user has been identified as the communication partner, the user can recognize it.

On the confirmation screen 700, identification information for allowing the user to identify the external apparatus identified as the communication partner in step S602 is displayed in an item 701. On the confirmation screen 700, a service set identifier (SSID) of the external apparatus identified as the communication partner is displayed in the item 701. The SSID of the external apparatus is included in a response packet transmitted from the external apparatus in response to the search packet transmitted in step S601, and the SSID acquired from the response packet by the wireless communication unit 302 is displayed in the item 701. Further, the response packet may include not only the SSID, but also other pieces of identification information (for example, an arbitrary name of the external apparatus), and identification information different from the SSID may be displayed in the item 701. Also, a plurality of pieces of identification information may be displayed in the item 701.

The user confirms the external apparatus identified as the communication partner by checking the item 701 on the confirmation screen 700, and then selects an item 702 or an item 703. If the external apparatus displayed in the item 701 is an external apparatus intended by the user, the user selects the item 702. On the other hand, if the external apparatus displayed in the item 701 is not the external apparatus intended by the user, the user selects the item 703.

In step S605, the wireless communication unit 302 determines whether connection processing is executed on the communication partner identified in step S602. If the user selects the item 702 on the confirmation screen 700, the wireless communication unit 302 determines to execute the connection processing (YES in step S605), and the processing proceeds to step S606. On the other hand, if the user selects the item 703 on the confirmation screen 700, the wireless communication unit 302 determines not to execute connection processing (NO in step S605), and the processing proceeds to step S607.

In step S606, the wireless communication unit 302 executes connection processing on the communication partner identified in step S602. In the present exemplary embodiment, the wireless communication unit 302 performs the following four processes as the connection processing. The first is a role determination for determining which becomes an access point (group owner), and which becomes a client. The second is to share parameters by using the WPS, and the third is secure connection by using the shared parameters. Then, the fourth is addressing for performing IP communication between the printing apparatus 200 and the external apparatus. These four processes are processing similar to the processing sequence of the Wi-Fi Direct described in steps S102 to S105 of FIG. 1. By performing the four processes as the connection processing in step S606, an application of the printing apparatus 200 and an application of the external apparatus can perform direct communications.

In step S603, if the wireless communication unit 302 determines that the communication partner identified in step S602 is not to be confirmed by the user, the wireless communication unit 302 executes the connection processing in step S606 without performing confirmation via the confirmation screen 700.

On the other hand, if the wireless communication unit 302 determines not to execute connection processing (NO in step S605), in step S607, the wireless communication unit 302 terminates the processing with an error message without executing the connection processing described in step S606. In this case, because the external apparatus identified in step S602 is not an external apparatus intended by the user, in step S607, the wireless communication unit 302 performs control not to perform the wireless communication with the external apparatus unintended by the user. The processing in step S607 can prevent communication with the external apparatus unintended by the user.

In the present exemplary embodiment, the description is given of the configuration in which the user previously sets via the setting screen 510 whether the user confirmation function is made valid. However, the confirmation screen 700 may always be displayed without performing the setting. In this case, the processing in step S603 is not executed, and the processing in step S604 for the user confirming the communication partner identified in step S602 is executed.

As described above, according to the present exemplary embodiment, if an external apparatus that becomes a communication partner of the wireless communication has been identified, whether the identified external apparatus is an apparatus intended by the user can be confirmed by the user. This can prevent communication with the external apparatus unintended by the user.

Further, according to the present exemplary embodiment, the user can set in advance to the printing apparatus 200 whether the user confirmation function is made valid. The user confirmation function is a function for the user confirming whether the identified external apparatus is an external apparatus intended by the user. Consequently, it becomes possible to perform settings according to different purposes, for example, the user confirmation function is made valid when the user wants to prevent communications with an unintended external apparatus, or the user confirmation function is made invalid, when the user wants to shorten time required until the completion of connection processing with the external apparatus.

In the first exemplary embodiment, the description is given of a configuration of the printing apparatus 200 such that the user confirms whether the external apparatus identified as a communication partner is an apparatus intended by the user (user confirmation function). However, if the user who is going to perform wireless communication between the printing apparatus and the external apparatus does not know the user confirmation function described in the first exemplary embodiment, the following issue occurs. Assume that a certain user is going to perform the wireless communication between the printing apparatus 200 and a mobile terminal, for example, and instructs the printing apparatus 200 and the mobile terminal, in this order, to start the execution of the wireless communication. In this case, the confirmation screen 700 of FIG. 7 is displayed on the printing apparatus 200. However, the user who does not know the user confirmation function does not notice that the confirmation screen 700 is displayed. Consequently, the wireless communication (connection processing) is not started however long the user waits. Therefore, in a second exemplary embodiment, the user of an external apparatus such as a mobile terminal is notified that the printing apparatus 200 is in a user confirmation wait state.

Figure 8:
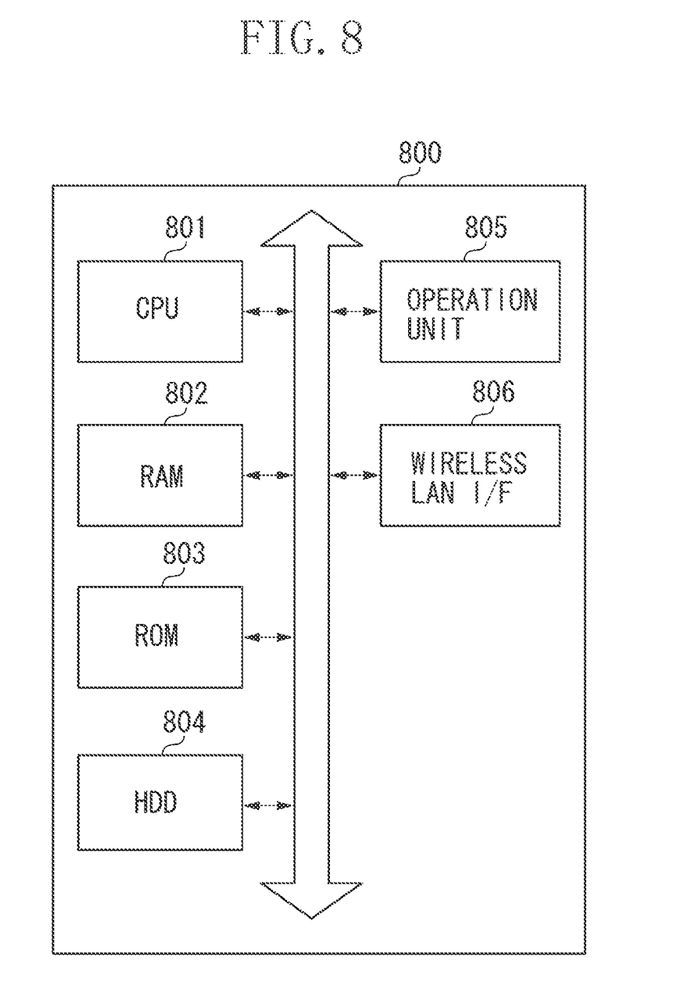
FIG. 8 is a diagram illustrating a configuration of a mobile terminal.

FIG. 8 is a diagram illustrating a hardware configuration of a mobile terminal 800. The mobile terminal 800 is also one example of communication apparatuses capable of executing wireless communications, similarly to the printing apparatus 200, and the printing apparatus 200 and the mobile terminal 800 constitute a communication system. The configuration of the printing apparatus 200 in the present exemplary embodiment is similar to the configuration illustrated in FIGS. 2 and 3, and therefore the description thereof will be omitted.

A CPU 801 reads a control program stored in a ROM 803 and controls the operation of the entire mobile terminal 800. A RAM 802 is used as a main memory or a temporary area such as a work area of the CPU 801. An HDD 804 stores data or various types of programs, or various types of information tables.

An operation unit 805 displays various types of screens such as an operation screen and a setting screen. Further, the operation unit 805 has a touch panel function, and can input various instructions into the mobile terminal 800 by the user performing touch operation or drag operation, or click operation.

A wireless LAN I/F 806 executes the wireless communication with an external apparatus such as the printing apparatus 200. The wireless LAN I/F 806 can transmits image data stored in a memory such as the HDD 804 to the printing apparatus 200 as print data.

Figure 10:
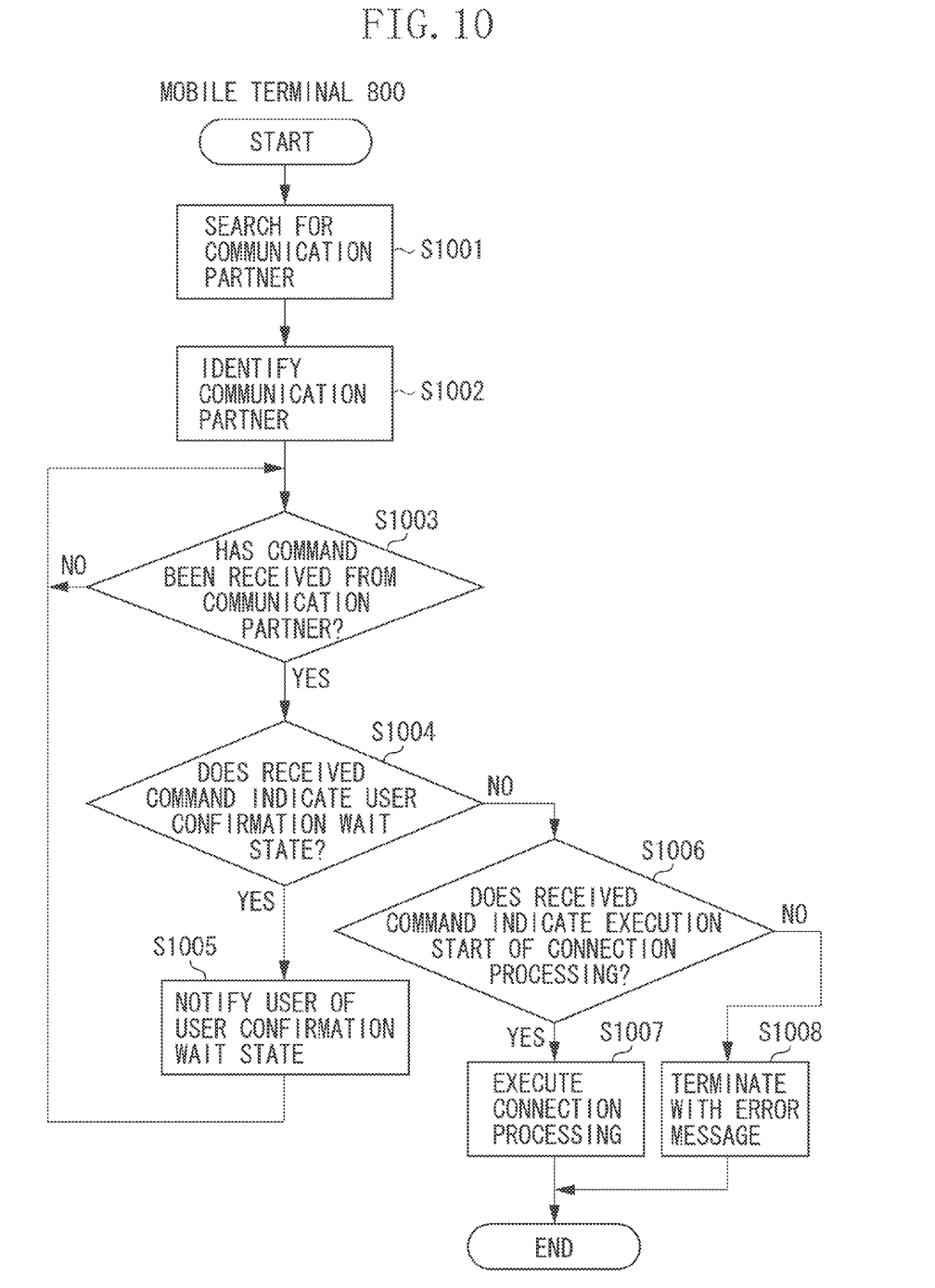
FIG. 10 is a flowchart illustrating processing executed by the mobile terminal according to the second exemplary embodiment.

The mobile terminal 800 is assumed such that one CPU 801 executes respective processing illustrated in the flowchart of FIG. 10 described below by using one memory (the RAM 802). However, other aspects may be used. For example, respective processing illustrated in the flowchart of FIG. 10 described below can be executed by causing a plurality of CPUs and a plurality of memories to operate cooperatively.

Next, with reference to the flowchart of FIG. 9, the description will be given of the processing executed when the user instructs the printing apparatus 200 to start the execution of the wireless communication. Respective steps illustrated in the flowchart of FIG. 9 are processed by the CPU 202 loading into the RAM 203 and executing a program stored in a memory such as the ROM 204. Among the respective steps illustrated in FIG. 9, in the steps in FIG. 9 with the same numerals as the steps in FIG. 6, the processing similar to those performed in FIG. 6 is performed, and therefore the detailed description thereof will be omitted.

When the user selects the item 501 of the setting screen 500, the wireless communication unit 302 starts the connection processing for performing the wireless communication with an external apparatus. First, in step S601, the wireless communication unit 302 searches for a communication partner. Then in step S602, the wireless communication unit 302 identifies the mobile terminal 800 as the communication partner.

In step S603, if the wireless communication unit 302 determines that the mobile terminal 800 identified as the communication partner is to be confirmed by the user (YES in step S603), then in step S604, the operation control unit 300 displays the confirmation screen 700 on the display unit 403. Then in step S901, the wireless communication unit 302 notifies the mobile terminal 800 serving as the communication partner that the printing apparatus 200 is in the user confirmation wait state.

Specifically, the wireless communication unit 302 transmits, to the mobile terminal 800, a confirmation wait command indicating that the printing apparatus 200 is waiting for the user confirmation. By receiving the confirmation wait command, the mobile terminal 800 can display a notification screen 1100 of FIG. 11 described below.

In the present exemplary embodiment, it has been described that the processing in step S901 is executed after step S604. However, order of step S604 and step S901 may be reversed, and step S604 and step S901 may be executed at the same time.

In the confirmation screen 700, if the user selects the item 702, then in step S605, the wireless communication unit 302 determines to execute the connection processing (YES in step S605), and the processing proceeds to step S902. Then in step S902, the wireless communication unit 302 executes the connection processing described in step S606. Further in step S902, the wireless communication unit 302 notifies the mobile terminal 800 of the execution start of the connection processing. Specifically, the wireless communication unit 302 transmits an execution command indicating the execution start of the connection processing to the mobile terminal 800.

On the other hand, if the user selects the item 703 on the confirmation screen 700, then in step S605, the wireless communication unit 302 determines not to execute the connection processing (NO in step S605), and the processing proceeds to step S903. Then in step S903, the wireless communication unit 302 terminates the processing with an error message similarly to step S607. Further in step S903, the wireless communication unit 302 notifies the mobile terminal 800 that the processing has terminated with the error message. Specifically, the wireless communication unit 302 transmits an error command indicating the termination with the error message to the mobile terminal 800.

Next, the processing to be executed in the mobile terminal 800 will be described with reference to a flowchart in FIG. 10. Respective steps illustrated in the flowchart of FIG. 10 are processed by the CPU 801 of the mobile terminal 800 loading a program stored in a memory such as the ROM 803 into the RAM 802 and executing it.

When the user instructs the mobile terminal 800 to start the execution of the wireless communication, then in step S1001, the wireless LAN I/F 806 searches for a communication partner, then in step S1002, the wireless LAN I/F 806 identifies the communication partner. In the present exemplary embodiment, the printing apparatus 200 is identified as the communication partner. The processing in steps S1001 and S1002 are executed similarly to the processing in steps S601 and S602 described in FIG. 6. Further, the screen similar to the one of FIG. 5 is displayed on the operation unit 805 of the mobile terminal 800, and the user issues an instruction to start the execution of the wireless communication via the screen.

Next in step S1003, the CPU 801 determines whether a certain command has been received from the printing apparatus 200 which is a communication partner.

If a certain command transmitted from the printing apparatus 200 (command transmitted in either of steps S901, S902, and S903) has been received (YES in step S1003), the processing proceeds to step S1004. On the other hand, if the command transmitted from the printing apparatus 200 has not been received (NO in step S1003), the mobile terminal 800 stands by to receive the command.

In step S1004, the CPU 801 determines whether the received command is a command indicating that the printing apparatus 200 is in the user confirmation wait state. If the mobile terminal 800 has received a confirmation wait command transmitted in step S901 (YES in step S1004), the CPU 801 determines that the received command is the command indicating that the printing apparatus 200 is in the user confirmation wait state, and the processing proceeds to step S1005. On the other hand, if the received command is not a confirmation wait command (NO in step S1004), the CPU 801 determines that the received command is not the command indicating that the printing apparatus 200 is in the user confirmation wait state, and the processing proceeds to step S1006.

In step S1005, the CPU 801 notifies the user that the printing apparatus 200 is in the user confirmation wait state (i.e., connection processing has not yet been executed). Specifically, the CPU 801 notifies the user that the printing apparatus 200 is in the user confirmation wait state by causing the operation unit 805 to display the notification screen 1100 of FIG. 11. By the user confirming the notification screen 1100, even a user who does not know the user confirmation function of the printing apparatus 200 can recognize that the printing apparatus 200 is requesting the user confirmation (for example, confirmation via the confirmation screen 700).

Figure 11:
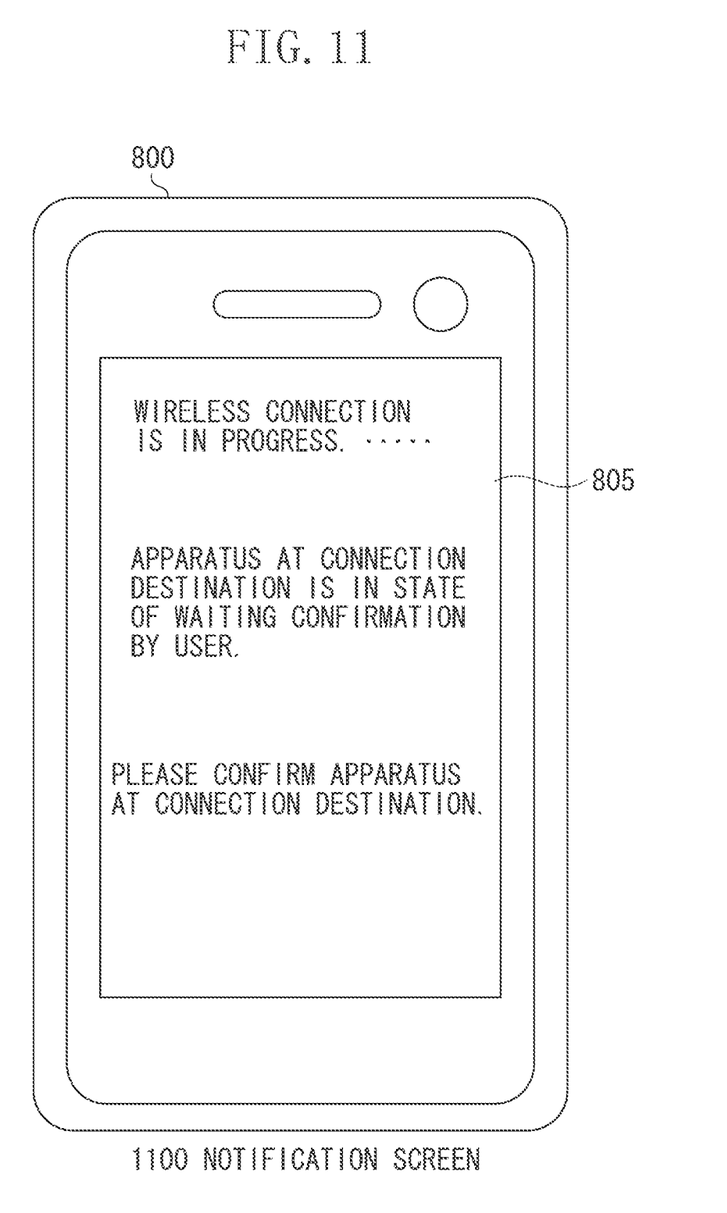
FIG. 11 is a diagram illustrating a notification screen.

In step S1006, the CPU 801 determines whether the received command is a command indicating execution start of the connection processing. If the mobile terminal 800 has received the execution command transmitted in step S902, the CPU 801 determines that the received command is a command indicating execution start of the connection processing, and the processing proceeds to step S1007. Then in step S1007, the wireless LAN I/F 806 executes the connection processing. If the operation unit 805 displays the notification screen 1100, the wireless LAN I/F 806 executes the connection processing after stopping display of the notification screen 1100. The connection processing executed in step S1007 is processing similar to the connection processing described in step S606.

On the other hand, if the command received by the mobile terminal 800 is the error command transmitted in step S903, in step S1006, the CPU 801 determines that the received command is not a command indicating execution start of the connection processing (NO in step S1006), and the processing proceeds to step S1008. Then in step S1008, the wireless LAN I/F 806 terminates the processing with an error message without executing the connection processing. If the operation unit 805 displays the notification screen 1100, the wireless LAN I/F 806 terminates the processing with the error message after stopping the display of the notification screen 1100.

As described above, according to the present exemplary embodiment, the printing apparatus 200 notifies the mobile terminal 800 that the printing apparatus 200 is in the user confirmation wait state. Further, the mobile terminal which has received the notification can notify the user that the printing apparatus 200 is in the user confirmation wait state. Consequently, even if a user does not know that the user confirmation is required for the printing apparatus 200, the user can recognize the necessity of the user confirmation.

In the above-described exemplary embodiment, it has been described that the printing apparatus 200 and the mobile terminal 800 execute the Wi-Fi Direct as the wireless communication. However, the wireless communication is not limited to the Wi-Fi Direct. The present invention can be applied to any wireless communication as long as it is the one in which a plurality of communication apparatuses can directly communicate with each other like the Wi-Fi Direct.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)N, a flash memory device, a memory card, and the like.

According to the exemplary embodiments of the present invention, if a communication partner of the wireless communication is identified, a user confirms whether communication is to be executed with the identified communication partner, which prevents communication with a communication partner unintended by the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-033420 filed Feb. 22, 2013, which is hereby incorporated by reference herein in its entirety.

What is claimed is:

1. A communication apparatus capable of executing a direct wireless communication, the communication apparatus comprising:

an identification unit configured to identify, by performing search processing, one external apparatus as a communication partner of the direct wireless communication;

a display unit configured to display, in a case where the identification unit identifies one external apparatus as a communication partner of the direct wireless communication, an instruction screen for a user to instruct to establish the direct wireless communication between the communication apparatus and the external apparatus identified by the identification unit;

a notification unit configured to notify, in a case where the display unit displays the instruction screen, the external apparatus identified by the identification unit that the communication apparatus is waiting for the instruction of the user; and a connection unit configured to perform, in a case where the user instructs to establish the direct wireless communication via the instruction screen, connection processing for establishing the direct wireless communication between the communication apparatus and the external apparatus identified by the identification unit.

2. The communication apparatus according to claim 1, wherein, in a case where the user instructs not to establish the direct wireless communication via the instruction screen, the connection unit does not perform the connection processing.

3. The communication apparatus according to claim 1, wherein the connection processing is processing for determining roles of the external apparatus identified by the identification unit and the communication apparatus in the direct wireless communication, and establishing the wireless communication based on the determined roles.

4. A method for controlling a communication apparatus capable of executing a direct wireless communication: the method comprising:

identifying, by performing search processing, one external apparatus as a communication partner of the direct wireless communication;

displaying, in a case where identifying includes identifying one external apparatus as a communication partner of the direct wireless communication, an instruction screen for a user to instruct to establish the direct wireless communication between the communication apparatus and the identified external apparatus;

notifying, in a case where displaying includes displaying the instruction screen, the identified external apparatus that the communication apparatus is waiting for the instruction of the user; and performing, in a case where the user instructs to establish the direct wireless communication via the instruction screen, connection processing for establishing the direct wireless communication between the communication apparatus and the identified external apparatus.

5. A non-transitory computer-readable storage medium storing a program causing a computer to execute the method according to claim 4.

6. The communication apparatus according to claim 2, wherein, in a case where the user instructs not to establish the direct wireless communication via the instruction screen, the connection unit does not perform the connection processing and the notification unit notifies the external apparatus identified by the identification unit that the direct wireless communication is not established.

7. The communication apparatus according to claim 1, wherein, in a case where the communication apparatus executes the direct wireless communication, either one of the communication apparatus and the external apparatus identified by the identification unit operates as an access point.

8. The communication apparatus according to claim 1, wherein identification information of the external apparatus identified by the identification unit is displayed on the instruction screen.

9. The communication apparatus according to claim 8, wherein the identification information is a name of the external apparatus identified by the identification unit.

10. The communication apparatus according to claim 1, wherein the communication apparatus is a printing apparatus capable of executing printing processing.

\* \* \* \* \*